United States Patent
Wang

Patent Number: 5,583,453
Date of Patent: Dec. 10, 1996

[54] INCREMENTOR/DECREMENTOR

[75] Inventor: Hsinshih Wang, Fremont, Calif.

[73] Assignee: National Semiconductor Corporation, Santa Clara, Calif.

[21] Appl. No.: 451,214

[22] Filed: May 26, 1995

[51] Int. Cl.$^6$ .................................................. H03K 19/00
[52] U.S. Cl. ................... 326/53; 326/113; 377/94
[58] Field of Search ........................... 326/37, 53, 113; 377/94, 107, 111

[56] References Cited

U.S. PATENT DOCUMENTS

| | | | |
|---|---|---|---|
| 4,486,851 | 12/1984 | Christopher et al. | 377/123 |
| 5,021,994 | 6/1991 | Tai et al. | 364/900 |
| 5,079,519 | 1/1992 | Ashby et al. | 331/1 |
| 5,189,319 | 2/1993 | Fung et al. | 307/452 |
| 5,204,953 | 4/1993 | Dixit | 395/400 |
| 5,254,888 | 10/1993 | Lee et al. | 307/480 |
| 5,259,006 | 11/1993 | Price et al. | 375/107 |
| 5,404,473 | 4/1995 | Papworth et al. | 395/375 |
| 5,408,626 | 4/1995 | Dixit | 395/400 |

OTHER PUBLICATIONS

L-T Wang et al., "Feedback Shift Registers For Self-Testing Circuits", *VLSI Systems Designs*, December 1986.

Masakazu Shoji, "CMOS Dynamic Gates", Chapter 5, *AT&T CMOS Circuit Technology*, Prentice Hall, 1988, pp. 210–257.

Guthrie, Charles, "Power–On Sequencing For Liquid Crystal Displays; Why, When, And How", *Sharp Application Notes*, Sharp Corporation, 1994, pp. 2–1 thru 2–9.

Bernd Moeschen, "NS32SP160—Feature Communication Controller Architecture Specification", *National Semiconductor*, Rev. 1.0, May 13, 1993.

Agrawal, Rakesh K., *80x86 Architecture and Programming, vol. II: Architecture Reference*, Chap. 4, Prentice Hall, 1991, pp. 542–543.

Intel1486 Microprocessor Family Programmer's Reference Manual, Intel Corporation, 1993.

"8237A High Performance Programmable DMA Controller (8237A, 8237A-4, 8237A-5)", *Peripheral Components*, Intel, 1992, pp. 3–14 thru 3–50.

Hennessy, John, et al., "Interpreting Memory Addresses", *Computer Architecture A Quantitative Approach*, pp. 95–97, Morgan Kaufmann Publishers, Inc. 1990.

PowerPC601 Reference Manual, IBM, 1994, Chapter 9, "System Interface Operation", pp. 9–15 thru 9–17.

Intel Corp. Microsoft Corp., *Advanced Power Management (APM) BIOS Interface Specification*, Revision 1.1, Sep. 1993.

*Primary Examiner*—David R. Hudspeth
*Attorney, Agent, or Firm*—Limbach & Limbach L.L.P.

[57] ABSTRACT

A logic circuit provides increment functions +1 and +2 and decrement functions −1 and −2.

2 Claims, 3 Drawing Sheets

Integrate +1, −1, +2 and −2 into a single design

Table 1: N bit Incrementor/Decrementor function

| BYONE | INC | FUNCTION |
|---|---|---|
| 0 | 0 | Z=A−2 |
| 0 | 1 | Z=A+2 |
| 1 | 0 | Z=A−1 |
| 1 | 1 | Z=A+1 |

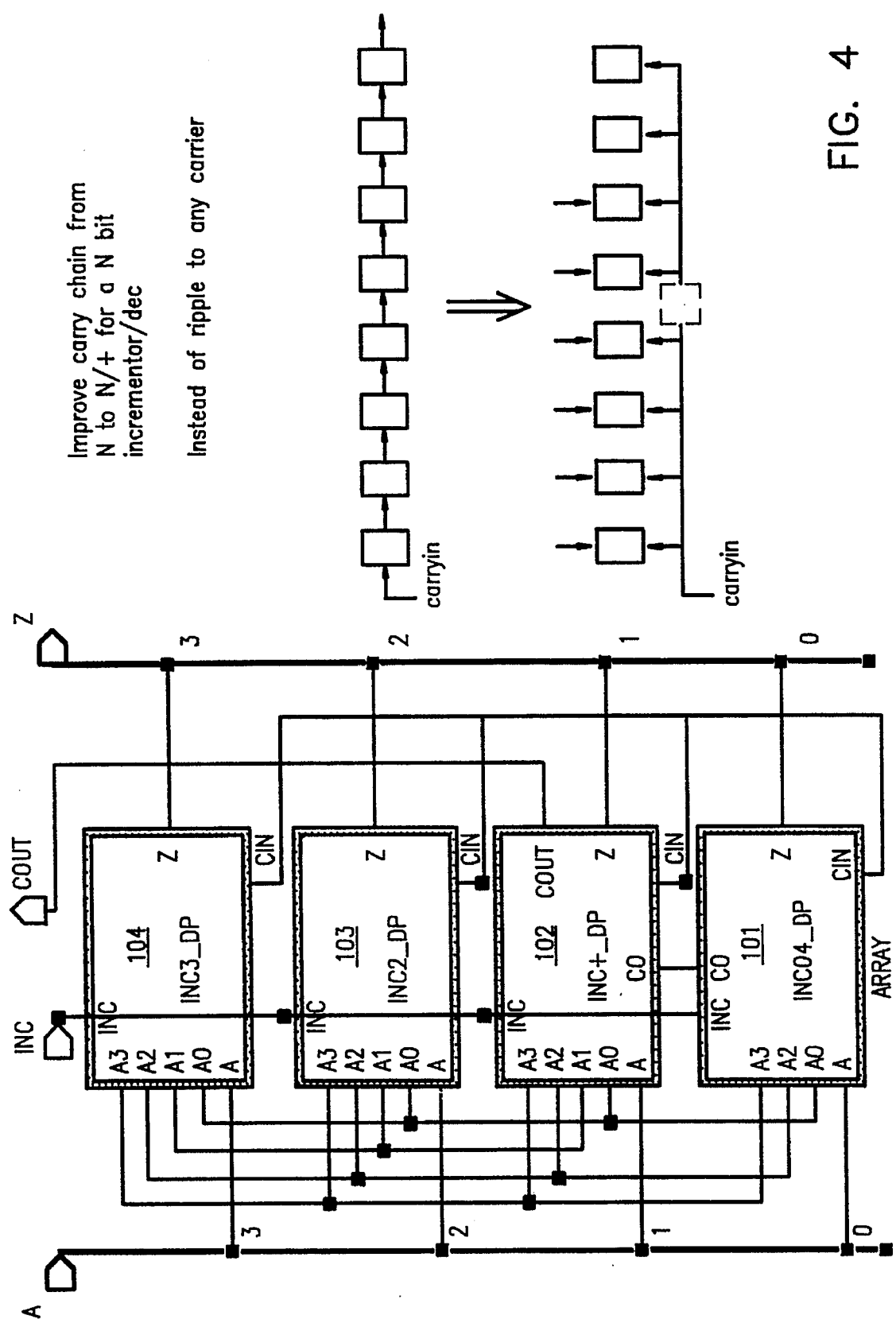

INCREMENTOR/DECREMENTOR

BACKGROUND OF THE INVENTION

The present invention relates generally to logic circuits, and more particularly, to an incrementor/decrementor.

In many applications, conventional incrementor/decrementor circuits provide a simple function, namely increment by one or decrement by one. However, in some applications it is necessary to have the additional function of increment by two or decrement by two. Conventional logic circuits separate these two functions, but it would be desirable to have both functions in a single logic circuit.

Further, prior art incrementors propagate a carry chain in correspondence to the number of bits which are incremented. It would be desirable to reduce the propagation time for a carry chain in an incrementor circuit.

SUMMARY OF THE INVENTION

A logic circuit is disclosed which provides the increment and decrement functions, namely +1, −1, +2 and −2, in a single integrated design.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

FIG. 4 is a block diagram of a 4-bit slice using the incrementor/decrementor cells of FIG. 3.

DETAILED DESCRIPTION OF THE INVENTION

The present invention is a logic circuit which provides the increment and decrement functions, namely +1, −1, +2 and −2, in a single integrated design. The logic circuit is designed to be utilizable in an integrated microprocessor system that generates control signals in a well known manner. Two such control signals are required by the present invention, and these signals are defined as INC and BYONE. The INC signal will be true when it is desired to increment by one. The BYONE signal will also be true when it is desired to increment by one.

Figure 1:
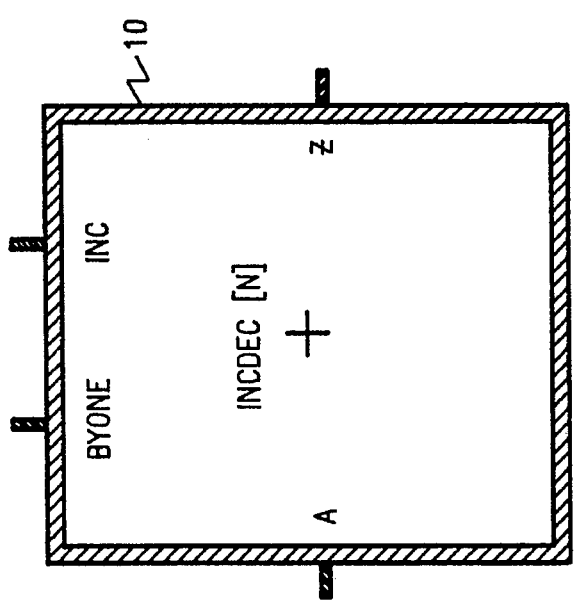
FIG. 1 is a functional block diagram of an incrementor/decrementor cell according to the present invention.

A block diagram of a n-bit incrementor/decrementor cell 10 is illustrated in FIG. 1. The incrementor/decrementor cell 10 has an input signal A, an output signal Z, as well as the two control signals BYONE and INC. The incrementor/decrementor cell 10 realizes the following function:

| BYONE | INC | Function |
|-------|-----|----------|
| 0 | 0 | Z = A−2 |
| 0 | 1 | Z = A+2 |
| 1 | 0 | Z = A−1 |
| 1 | 1 | Z = A+1 |

Figure 2:
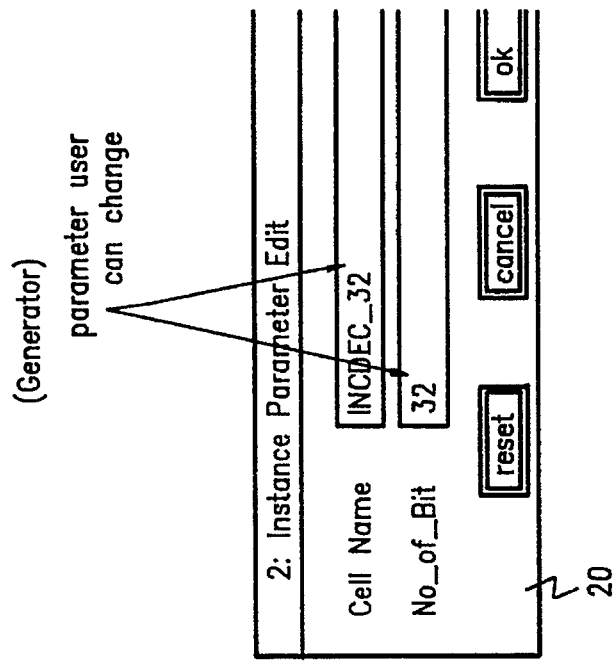
FIG. 2 is a representation of a user icon which permits user modification of the parameters of the incrementor/decrementor cell.

An icon 20 may be programmed to be called up by the user to change the name of the incrementor/decrementor cell 10 or the number of bits handled by the incrementor/decrementor cell, as illustrated in FIG. 2.

Figure 3:
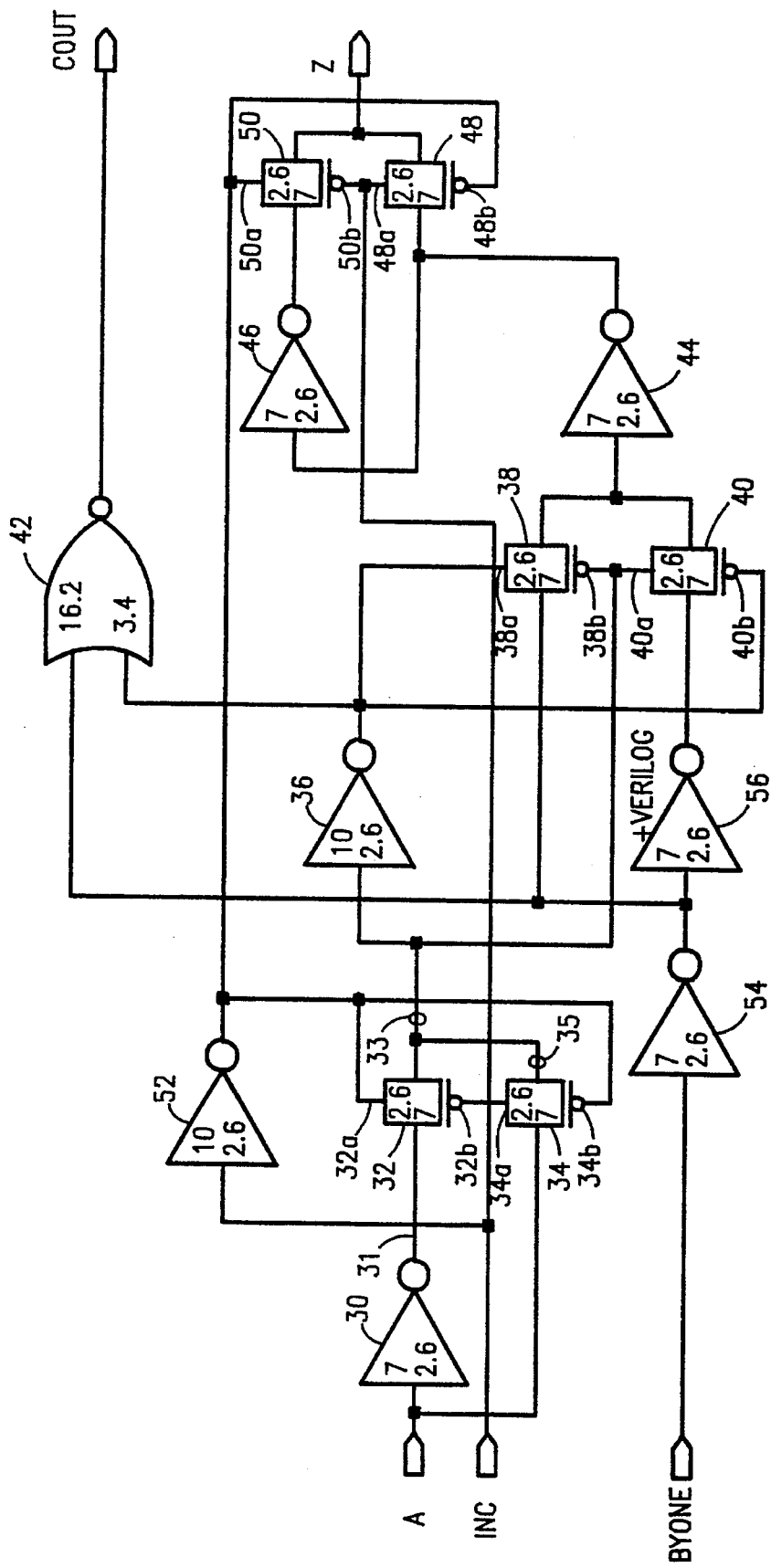
FIG. 3 is a schematic diagram of the incrementor/decrementor cell of FIG. 1.

Referring now to FIG. 3, a schematic diagram of incrementor/decrementor cell 10 is illustrated. A single bit input signal A is provided to an inverter 30, which generates $\overline{A}$ as its output signal 31. Signal 31 is provided to a transmission gate 32, which transmits output signal 33, depending on the state of enable inputs 32a and 32b.

Input signal A is also provided to transmission gate 34, which transmits output signal 35, depending on the state of enable inputs 34a and 34b. The output of transmission gates 32 and 34 are mutually coupled to inverter 36 and also to enable inputs 38b and 40a for transmission gates 38 and 40, respectively.

The output of inverter 36 is coupled to the input of NOR gate 42, to the enable input 38a of transmission gate 38, and to the enable input 40b of transmission gate 40. The output of transmission gates 38 and 40 are mutually coupled to inverter 44. The output of inverter 44 is coupled to inverter 46 and also to transmission gate 48. The output of inverter 46 is coupled to transmission gate 50. The output of transmission gates 48 and 50 are mutually coupled and provide the output signal Z.

The INC control signal is provided to enable input 32b of transmission gate 32, to enable input 34a of transmission gate 34, to enable input 48a of transmission gate 48, to enable input 50b of transmission gate 50, as well as to inverter 52. The output of inverter 52 is coupled to enable input 32a of transmission gate 32, to enable input 34b of transmission gate 34, to enable input 48b of transmission gate 48, to enable input 50a of transmission gate 50.

The BYONE control signal is provided to inverter 54. The output of inverter 54 is coupled to the input of inverter 56, to the input of transmission gate 38, and to the input of NOR gate 42. The output of inverted 56 is coupled to the input of transmission gate 40.

The output of NOR gate 42 provides the output signal COUT, which indicates a carry out when true.

Referring now to FIG. 4, a 4-bit slice of a microprocessor system data path is shown as having four incrementor/decrementor cells 101, 102, 103 and 104. Each of the cells is virtually identical to the cell described in FIG. 3, except that only cell 102 has NOR gate 42 providing a carry out signal COUT. By providing the carry out on only one bit of an n-bit slice, the propagation time for the carry chain is improved from n to n/4 for an n-bit incrementor.

The invention embodiments described herein have been implemented in an integrated circuit which includes a number of additional functions and features which are described in the following co-pending, commonly assigned patent applications, the disclosure of each of which is incorporated herein by reference: U.S. patent application Ser. No. 08/451,319, entitled "DISPLAY CONTROLLER CAPABLE OF ACCESSING AN EXTERNAL MEMORY FOR GRAY SCALE MODULATION DATA" (atty. docket no. NSC1-62700); U.S. patent application Ser. No. 08/451,965, entitled "SERIAL INTERFACE CAPABLE OF OPERATING IN TWO DIFFERENT SERIAL DATA TRANSFER MODES" (atty. docket no. NSC1-62800); U.S. patent application Ser. No. 08/453,076, entitled "HIGH PERFORMANCE MULTIFUNCTION DIRECT MEMORY ACCESS (DMA) CONTROLLER" (atty. docket no. NSC1-62900); U.S. patent application Ser. No. 08/452,001, entitled "OPEN DRAIN MULTI-SOURCE CLOCK GENERATOR HAV- ING MINIMUM PULSE WIDTH" (atty. docket no. NSC1-63000); U.S. patent application Ser. No. 08/451,503, entitled "INTEGRATED CIRCUIT WITH MULTIPLE FUNCTIONS SHARING MULTIPLE INTERNAL SIGNAL BUSES ACCORDING TO DISTRIBUTED BUS ACCESS AND CONTROL ARBITRATION" (atty. docket no. NSC1-63100); U.S. patent application Ser. No. 08/451,924, entitled "EXECUTION UNIT ARCHITECTURE TO SUPPORT x86 INSTRUCTION SET AND x86 SEGMENTED ADDRESSING" (atty. docket no. NSC1-63300); U.S. patent application Ser. No. 08/451,444, entitled "BARREL SHIFTER" (atty. docket no. NSC1-63400); U.S. patent application Ser. No. 08/451,204, entitled "BIT SEARCHING THROUGH 8, 16, OR 32-BIT OPERANDS USING A 32-BIT DATA PATH" (atty. docket no. NSC1-63500); U.S. patent application Ser. No. 08/451,195, entitled "DOUBLE PRECISION (64-BIT) SHIFT OPERATIONS USING A 32-BIT DATA PATH" (atty. docket no. NSC1-63600); U.S. patent application Ser. No. 08/451,571, entitled "METHOD FOR PERFORMING SIGNED DIVISION" (atty. docket no. NSC1-63700); U.S. patent application Ser. No. 08/452,162, entitled "METHOD FOR PERFORMING ROTATE THROUGH CARRY USING A 32-BIT BARREL SHIFTER AND COUNTER" (atty. docket no. NSC1-63800); U.S. patent application Ser. No. 08/451,434, entitled "AREA AND TIME EFFICIENT FIELD EXTRACTION CIRCUIT" (atty. docket no. NSC1-63900); U.S. patent application Ser. No. 08/451,535, entitled "NON-ARITHMETICAL CIRCULAR BUFFER CELL AVAILABILITY STATUS INDICATOR CIRCUIT" (atty. docket no. NSC1-64000); U.S. patent application Ser. No. 08/445,563, entitled "TAGGED PREFETCH AND INSTRUCTION DECODER FOR VARIABLE LENGTH INSTRUCTION SET AND METHOD OF OPERATION" (atty. docket no. NSC1-64100); U.S. patent application Ser. No. 08/450,153, entitled "PARTITIONED DECODER CIRCUIT FOR LOW POWER OPERATION" (atty. docket no. NSC1-64200); U.S. patent application Ser. No. 08/451,495, entitled "CIRCUIT FOR DESIGNATING INSTRUCTION POINTERS FOR USE BY A PROCESSOR DECODER" (atty. docket no. NSC1-64300); U.S. patent application Ser. No. 08/451,219, entitled "CIRCUIT FOR GENERATING A DEMAND-BASED GATED CLOCK" (atty. docket no. NSC1-64500); U.S. patent application Ser. No. 08/451,214, entitled "INCREMENTOR/DECREMENTOR" (atty. docket no. NSC1-64700); U.S. patent application Ser. No. 08/451,150, entitled "A PIPELINED MICROPROCESSOR THAT PIPELINES MEMORY REQUESTS TO AN EXTERNAL MEMORY" (atty. docket no. NSC1-64800); U.S. patent application Ser. No. 08/451,198, entitled "CODE BREAKPOINT DECODER" (atty. docket no. NSC1-64900); U.S. patent application Ser. No. 08/445,569, entitled "TWO TIER PREFETCH BUFFER STRUCTURE AND METHOD WITH BYPASS" (atty. docket no. NSC1-65000); U.S. patent application Ser. No. 08/445,564, entitled "INSTRUCTION LIMIT CHECK FOR MICROPROCESSOR" (atty. docket no. NSC1-65100); U.S. patent application Ser. No. 08/452,306, entitled "A PIPELINED MICROPROCESSOR THAT MAKES MEMORY REQUESTS TO A CACHE MEMORY AND AN EXTERNAL MEMORY CONTROLLER DURING THE SAME CLOCK CYCLE" (atty. docket no. NSC1-65200); U.S. patent application Ser. No. 08/569,001, entitled "APPARATUS AND METHOD FOR EFFICIENT COMPUTATION OF A 486™ MICROPROCESSOR COMPATIBLE POP INSTRUCTION" (atty. docket no. NSC1-65700); U.S. patent application Ser. No. 08/450,154, entitled "APPARATUS AND METHOD FOR EFFICIENTLY DETERMINING ADDRESSES FOR MISALIGNED DATA STORED IN MEMORY" (atty. docket no. NSC1-65800); U.S. patent application Ser. No. 08/451,742, entitled "METHOD OF IMPLEMENTING FAST 486™ MICROPROCESSOR COMPATIBLE STRING OPERATION" (atty. docket no. NSC1-65900); U.S. patent application Ser. No. 08/452,659, entitled "A PIPELINED MICROPROCESSOR THAT PREVENTS THE CACHE FROM BEING READ WHEN THE CONTENTS OF THE CACHE ARE INVALID" (atty. docket no. NSC1-66000); U.S. patent application Ser. No. 08/451,507, entitled "DRAM CONTROLLER THAT REDUCES THE TIME REQUIRED TO PROCESS MEMORY REQUESTS" (atty. docket no. NSC1-66300); U.S. patent application Ser. No. 08/451,420, entitled "INTEGRATED PRIMARY BUS AND SECONDARY BUS CONTROLLER WITH REDUCED PIN COUNT" (atty. docket no. NSC1-66400); U.S. patent application Ser. No. 08/452,365, entitled "SUPPLY AND INTERFACE CONFIGURABLE INPUT/OUTPUT BUFFER" (atty. docket no. NSC1-66500); U.S. patent application Ser. No. 08/451,744, entitled "CLOCK GENERATION CIRCUIT FOR A DISPLAY CONTROLLER HAVING A FINE TUNEABLE FRAME RATE" (atty. docket no. NSC1-66600); U.S. patent application Ser. No. 08/451,206, entitled "CONFIGURABLE POWER MANAGEMENT SCHEME" (atty. docket no. NSC1-66700); U.S. patent application Ser. No. 08/452,350, entitled "BIDIRECTIONAL PARALLEL SIGNAL INTERFACE" (atty. docket no. NSC1-67000); U.S. patent application Ser. No. 08/452,094, entitled "LIQUID CRYSTAL DISPLAY (LCD) PROTECTION CIRCUIT" (atty. docket no. NSC1-67100); "INDICATOR CIRCUIT" (atty. docket no. NSC1-67400); U.S. patent application Ser. No. 08/450,156, entitled "DISPLAY CONTROLLER CAPABLE OF ACCESSING GRAPHICS DATA FROM A SHARED SYSTEM MEMORY" (atty. docket no. NSC1-67500); U.S. patent application Ser. No. 08/450,726, entitled "INTEGRATED CIRCUIT WITH TEST SIGNAL BUSES AND TEST CONTROL CIRCUITS" (atty. docket no. NSC1-67600); U.S. patent application Ser. No. 08/450,568, entitled "DECODE BLOCK TEST METHOD AND APPARATUS" (atty. docket no. NSC1-68000).

It should be understood that the invention is not intended to be limited by the specifics of the above-described embodiment, but rather defined by the accompanying claims.

What is claimed is:

1. An incrementor/decrementor cell, comprising:

an input signal;

a first control signal;

a second control signal;

a first inverter having an input and an output, said input being coupled to the input signal;

a first transmission gate having an input, an output, a high enable input and a low enable input, wherein the input is coupled to the output of the first inverter, the high enable input is coupled to the output of a seventh inverter, and the low enable input is coupled to the second control signal;

a second transmission gate having an input, an output, a high enable input and a low enable input, wherein the input is coupled to the input signal, the high enable input is coupled to the second control signal, and the low enable input is coupled to the output of the seventh inverter;

a second inverter having an input and an output, said input being mutually coupled to the outputs of the first and second transmission gates;

a third inverter having an input and an output, said input being coupled to a first control signal;

a fourth inverter having an input and an output, said input being coupled to the output of the third inverter;

a third transmission gate having an input, an output, a high enable input and a low enable input, wherein the input is coupled to the output of the third inverter, the high enable input is coupled to the output of the second inverter, and the low enable input is coupled to the output of the first transmission gate;

a fourth transmission gate having an input, an output, a high enable input and a low enable input, wherein the input is coupled to the output of the fourth inverter, the high enable input is coupled to the output of the first transmission gate, and the low enable input is coupled to the output of the second inverter;

a fifth inverter having an input and an output, said input being mutually coupled to the outputs of the third and fourth transmission gates;

a sixth inverter having an input and an output, said input being coupled to the output of the fifth inverter;

a fifth transmission gate having an input, an output, a high enable input and a low enable input, wherein the input is coupled to the output of the sixth inverter, the high enable input is coupled to the output of the seventh inverter, and the low enable input is coupled to the second control signal;

a sixth transmission gate having an input, an output, a high enable input and a low enable input, wherein the input is coupled to the output of the fifth inverter, the high enable input is coupled to the second control signal, and the low enable input is coupled to the output of the seventh inverter; and a seventh inverter having an input and an output, said input being coupled to a second control signal, said output being mutually coupled to the high enable input of the first transmission gate, to the low enable input of the second transmission gate, to the high enable input of the fifth transmission gate, and to the low enable input of the sixth transmission gate.

2. An incrementor/decrementor cell as in claim 1, further comprising a NOR gate having a first input, a second input and an output, said first input being coupled to the output of the third inverter and said second input being coupled to the output of the second inverter.

* * * * *